United States Patent [19]

Ancelle et al.

[11] 4,155,845

[45] May 22, 1979

[54] TREATMENT OF PULP MILL EFFLUENTS

[75] Inventors: Bernard Ancelle; Serge Lambert, both of Lyon, France

[73] Assignee: Rhone-Poulenc Industries, Paris, France

[21] Appl. No.: 795,564

[22] Filed: May 10, 1977

[30] Foreign Application Priority Data

May 12, 1976 [FR] France .................. 76 15150

[51] Int. Cl.$^2$ ............ B01D 13/00; B01D 31/00; D21C 11/00
[52] U.S. Cl. ................ 210/22 R; 210/23 F; 162/29
[58] Field of Search ............ 210/52, 23 F, 73 R, 210/259, 433 M, 22; 162/29

[56] References Cited

U.S. PATENT DOCUMENTS

| 3,171,803 | 3/1965 | Rice et al. | 210/52 |
|---|---|---|---|
| 3,472,767 | 10/1969 | Lees | 210/52 |
| 3,516,932 | 6/1970 | Hedrick et al. | 210/52 |
| 3,519,558 | 7/1970 | Cooper et al. | 210/23 F |
| 3,578,587 | 5/1971 | Kemmer | 210/52 |
| 3,615,024 | 10/1971 | Michaels | 210/490 |
| 3,639,206 | 2/1972 | Spruill | 162/29 |
| 4,014,787 | 3/1977 | Shorr | 210/23 F |

OTHER PUBLICATIONS

A. S. Michaels, "New Separation Technique for the CPI" Chemical Engineering Progress (vol. 64, No. 12) Dec. 1968, pp. 31–43.
Bailey, M. W. Solute Interactions in Ultrafiltration Treatment of Paper Mill Wastes, North Carolina State Univ. Ph. D. Thesis 1973.
Beder, Henry et al., Removal of Solutes from Mill Effluents by Reverse Osmosis Tappi, May 1970, vol. 53, No. 5.
Wiley, A. J. et al., Application of Reverse Osmosis to Processing of Spent Liquors from the Pulp and Paper Industry, Tappi, Sep. 1967, vol. 50 Hackh's Chemical Dictionary, 4th Edition, p. 616.

Primary Examiner—Charles N. Hart
Assistant Examiner—David R. Sadowski
Attorney, Agent, or Firm—Bacon & Thomas

[57] ABSTRACT

Pulp mill effluents, particularly soda-containing treatment liquors, are subjected to a separatory treatment comprising a pre-treatment with flocculating agent in a sub-critical amount incapable of effecting flocculation, followed by an ultrafiltration of the pre-treated effluent.

11 Claims, No Drawings

TREATMENT OF PULP MILL EFFLUENTS

BACKGROUND OF THE INVENTION

1. Field of the Invention

The present invention relates to a process for the treatment of pulp mill effluents, and particularly to soda-containing effluents. The present invention, more specifically, relates to the ultrafiltration of such effluents.

2. Description of the Prior Art

The highly toxic nature of pulp or paper mill effluents is well known, as well as the highly deleterious results which follow the discharge of such effluents from a mill to a waterway. As these effluents are strongly polluting in nature, the art further recognizes the need for some treatment thereof prior to discharge.

As a norm, pulp mill effluents derived from paper pulp bleaching operations result from a plurality of chemical treatments or modifications in the pulping operations. Typically, the bleaching processes conventionally employed are comprised of a first chlorine treatment and a second sodium hydroxide treatment, usually followed by a water wash in order to remove compounds which have been rendered soluble in the process. Accordingly, chlorination liquors are generated from the washing of the pulp after the chlorine bleach, and soda treatment liquors are derived from the pulp washing after bleaching in sodium hydroxide. These chlorination liquors and, more especially, soda treatment liquors constitute the most abundant proportions of pollutants generated during these pulping operations.

Not only are pulping effluents highly toxic, conventional processes generated copious quantities thereof. For example, the typical manufacture of one metric ton of paper pulp generates about 30 $m^3$ of chlorination liquors and about 10 $m^3$ of soda treatment liquors, these quantities subject to some variation depending upon the precise nature of the pulp produced, as well as the specific manufacturing and bleaching processes employed.

The very nature of pulp mill effluents also varies within a range depending upon the quality of the wood employed in the pulping operation, e.g., deciduous versus resinous, as well as the delignification process employed for the extraction of the ligin component, in the form of ligno-sulfonates, which preceeds the bleaching of the pulp.

Because of the very complicated chemical nature of the pulping effluents, the polluting characteristics thereof are found to be rather complex and ill-defined. Pragmatically, it has been found convenient to characterize these effluents in terms of the biological oxygen demand (BOD), the chemical oxygen demand (COD), and color; these parameters having been accorded a status in the art in terms of defining the principle polluting characteristics of the subject effluents. Yet another method of identifying the degree of pollution attributable to pulping effluents consists of a determination of the organic carbon content of the effluent, i.e., carbon derived from organic molecules.

Diverse treatment processes for pulp mill effluents have been proposed, particularly treatments based upon the use of calcium hydroxide and active charcoal. More recently, the utility of various membranes, and apparatus for use in conjunction therewith, have been proposed for the treatment of pulp mill effluents. In this regard, see, Beder et al., Tappi, v. 53, n. 5, at 883-7, May, 1970, which describes a process for the treatment of paper mill effluents by reverse osmosis and, more especially, ultrafiltration.

Along these lines, there has become a recent recognition of a distinction between reverse osmosis and ultrafiltration, the latter characterized by the fact that the membranes retain only solute molecules larger than the solvent molecules, whereas reverse osmosis membranes will also retain solute molecules of a size on the order of magnitude as that of the solvent molecules.

While considerable attention has been paid to the utility of membrane processes, various significant difficulties have minimized the practical ability to employ the same, especially on a commercial scale. Among the most significant difficulties presented are: (1) purely reverse osmosis processes suffer the disadvantage of requiring the use of very high pressure since the hydraulic pressure must be greater than the osmotic pressure of the effluent; (2) the use of cellulose acetate membranes conventionally employed necessitates an acid pre-treatment to avert hydrolysis of the acetate, this pre-treatment requiring large quantities of acid due to the strong alkalinity of the soda treatment liquors, as well as generating considerable quantities of salts as undesirable ancillary byproducts should it be desirable to discharge the effluent into a river, or the like; (3) membranes conventionally employed often become clogged or loaded, leading to a reduction in the flow characteristics of the process; and, (4) ultrafiltration of these effluents is incapable of adequately eliminating pollution due to coloration.

Accordingly, the need exists to overcome the deficiencies of prior art processes directed to the treatment of pulp mill effluents, particularly those containing soda treatment liquors. Additionally, the need exists to provide a simple, economical, and yet industrially-efficient process for the treatment of pulp mill effluents.

SUMMARY OF THE INVENTION

In accordance with the noted, and notable, deficiencies of the prior art, it is a primary object of the present invention to provide a simple, economical, and industrially-efficient process for the treatment of pulp mill effluents.

It is also an object of the present invention to provide an efficient process for the treatment of soda-containing liquors.

Yet other objects and advantages of the present invention will become apparent to the skilled artisan upon examination of the following detailed description of the invention.

It has been ascertained, in accordance with the present invention, that the foregoing objects may be realized in a process for the treatment of pulp mill effluents comprising the initial step of pre-treating that effluent by additions of a flocculating agent added in quantities less than those necessary to yield true flocculation, followed by an ultrafiltration of the pre-treated effluent.

DETAILED DESCRIPTION OF THE INVENTION

In order to more fully elucidate upon the various objects and advantages of the present invention, the following detailed description will be given with reference to certain preferred embodiments and exemplified with respect thereto. Along these lines, the invention will be described for the treatment of pulp mill effluents; however, the skilled artisan will readily appreciate that the present process is equally well adapted for the treatment of other analogous liquors, particularly soda-containing liquors. Accordingly, the following description is intended as illustrative only, and in no wise limitative.

Broadly, the present invention may be said to reside in the process of treating pulp mill effluents by the addition of a sub-critical amount of flocculating agent (i.e., an amount incapable of effecting true flocculation of the effluent), followed by an ultrafiltration of the pre-treated effluent. The quantity of flocculating agent employed will obviously vary depending upon the chemical characteristics thereof; it having been determined that the quantity may generally vary between about 2 and about 50% by weight, and preferably between about 7 and about 15%, of the quantity necessary to obtain proper or true flocculation. By proper or true flocculation is meant the amount of flocculating agent required to obtain a clear supernatant liquid (at least 60% decolorized) which is devoid of cloudiness after decantation from the precipitate, typically requiring less than about 1 hour.

The flocculating agent may be either a single chemical product, or a mixture of various chemical products. In the latter case, the constituents comprising the mixture may be added to the effluent simultaneously, or successively. As various flocculating systems found useful in conjunction with the instant process, those systems which give precipitate formation in an aqueous medium are most preferred, especially those which yield large quantities of precipitates. Accordingly, it has been found most advantageous to employ compounds or mixtures thereof, typically inorganic, which in aqueous media, yield an insoluble salt or hydroxide precipitate. While each of the various conventional flocculant systems are optimized in terms of varying pH levels, the skilled artisan may readily choose the components of the flocculating system and appropriate pH given the amount of flocculating agent employed. Specifically, those flocculating systems most preferred include:

(a) calcium hydroxide and aluminum sulfate;
(b) calcium hydroxide and carbon dioxide (bubbling $CO_2$ gas);
(c) calcium chloride and sodium carbonate; and,
(d) aluminum chlorosulfate.

Moreover, there may be added a flocculation adjuvant such as, for example, the sodium acrylate/acrylamide copolymers. Typically, such adjuvants will be added within a range of from about 0.1 to about 10% by weight based on the inorganic component of the flocculating system.

The ultrafiltration membranes employed in the present invention are those having a cut-off threshhold towards proteins of from about 4,000 to about 100,000, and preferably between about 5,000 and about 25,000. The term "cut-off threshhold" is meant to connote the limiting molecular weight for proteins, beyond which the membrane exhibits a degree of rejection greater than 95%. It is also preferred to use membranes which comprise of a polymer stable in media having a pH greater than 8, and more preferably, those stable to a pH greater than 10. Also, another preferred characteristic of the ultrafiltration membranes regards flow rates; a preferred flow rate, with pure water at 2 bars, being greater than 700 l/day/m$^2$, and more preferably, greater than 2,000 l/day/m$^2$.

The ultrafiltration step of the present process is conducted under a differential pressure generally between about 0.5 and about 20 bars, and preferably between about 1 and about 6 bars; the differential pressure referring to the difference in pressure across the membrane when disposed within the ultrafiltration apparatus. Also preferred is the maintenance of a linear speed of pre-treated effluent flowing over the surface of the membrane at a rate greater than about 0.1 meters per second, and preferably between about 1 and about 3 meters per second.

The following examples will further illustrate the process of the present invention, as well as demonstrate the advantages thereof. In this regard, each of the examples will make reference to various characteristics of the effluent, these characteristics being determined as follows:

(a) COD is measured in accordance with AFNOR Standard Specification No. T 90-101;

(b) the color of the effluent is measured, without adjustment of pH, by means of a spectrophotometer calibrated relative to platinum-cobalt reference samples, which samples are defined in ASTM Standard Specification No. D 1209-62; and, (c) the concentration of organic carbon is expressed in milligrams of carbon per liter of effluent, the concentration being calculated from measurements of the quantity of carbon obtained by the combustion of a sample at 900° C. (as an indication of the total carbon) and at 150° C. (as an indication of the inorganic carbon).

EXAMPLE 1

A pulp mill effluent consisting of a soda treatment liquor discharged from a bleaching plant for "kraft" paper pulp, derived from the wood of resinous trees, is subjected to treatment in accordance with the present invention. The effluent is measured to have a COD of 4,500, a color of 10,000, a pH of 10, and a viscosity substantially the same as water.

0.075 g/l of calcium hydroxide, $Ca(OH)_2$, 0.3 g/l of aluminum sulfate, $Al_2(SO_4)_3 \cdot 18\ H_2O$, and 0.4 mg/l of sodium acrylate/acrylamide copolymer are added successively to 300 cm$^3$ of this effluent. The combination of these three products constitutes a flocculating mixture which, at a dosage of about 10 times greater, effects flocculation in this effluent with a suitable decantation speed (about ½ hour), yielding a supernatant liquid which is clear to the naked eye.

The mixture of soda treatment liquor and flocculating agent is introduced to an ultrafiltration cell having disposed therein a membrane with a surface area of 39.2 cm$^2$. This membrane, which exhibits a flow rate, with water at 2 bars, of 9,800 l/day/m$^2$ and a cut-off threshhold of 15,000, consists of a complex polyelectrolyte of a mixture of two acrylonitrile copolymers, one with cationic groups and the other with anionic groups. The differential pressure is maintained at 2 bars, and agitation at the surface of the membrane eliminates the boundary-layer effect in the effluent.

270 cm$^3$ of ultrafiltrate are obtained having a color of 1,200, which corresponds to an 88% reduction thereof. Furthermore, the COD is measured to be 950, corresponding to a 78% reduction.

EXAMPLE 2

To 300 cm$^3$ of a pulp mill effluent, consisting of a soda treatment liquor from a paper pulp bleaching plant, having a color of 8,000 and a pH of 12.4, are added 0.08 g/l of calcium hydroxide, $Ca(OH)_2$, 0.4 g/l of aluminum sulfate, $Al_2(SO_4)_3 \cdot 18\ H_2O$, and 0.5 ppm of sodium acrylate/acrylamide copolymer, successively. The flocculation system constitutes a dosage of 1/10 of that necessary for proper flocculation and decantation.

The pre-treated soda effluent is subjected to ultrafiltration under the same conditions as those described in Example 1, save for the fact that the membrane is comprised of a sulfonated polysulfone, the flow rate thereof being 4,000 l/day/m$^2$ for pure water at 2 bars and having a cut-off threshhold of 10,000.

An ultrafiltrate is yielded, having a color of 2,800. This example was repeated without additions of the acrylic polymer and similar results were realized.

EXAMPLE 3

To 300 cm$^3$ of soda treatment effluent from a bleaching plant for textile pulp (pulp for viscose), obtained by the bisulfite process conducted on wood of deciduous trees, and having a color of 40,000 and a pH of 9.2, are added successively 0.65 g/l of calcium hydroxide, Ca(OH)$_2$, 2 g/l of aluminum sulfate, Al$_2$(SO$_4$)$_3$.18 H$_2$O, and 2 ppm of sodium acrylate/acrylamide copolymer. This flocculation system constitutes a 1/10 dosage with respect to the quantity necessary to achieve proper flocculation and decantation.

The pre-treated soda effluent is subjected to ultrafiltration under the conditions described in Example 2. The ultrafiltrate obtained exhibits a color of 16,000, corresponding to a 60% reduction thereof.

EXAMPLE 4

To 20 liters of a soda treatment effluent from a bleaching plant for "kraft" paper pulp from resinous wood, which effluent exhibits a color of 25,000, a pH of 12.3, and an organic carbon concentration of 1,420, is added successively 1.5 g/l of sodium carbonate, Na$_2$CO$_3$, 1.5 g/l of calcium chloride, CaCl$_2$, and 1 ppm of sodium acrylate/acrylamide copolymer. The flocculation system constitutes a 1/10 dosage of the quantity necessary for proper flocculation and decantation.

The soda treatment liquor and flocculating agent mixture is treated in an ultrafiltration apparatus comprising a stack of four membranes, each having a surface area of 1.1 dm$^2$. The membranes are comprised of sulfonated polysulfone and exhibit a flow rate, with pure water at 2 bars, of 4,000 l/day/m$^2$ and a cut-off threshhold of 10,000. A differential pressure of 1 bar is maintained, and the flow rate of effluent over the surface of the membrane is 1.5 m/second.

18 liters of ultrafiltrate are obtained with a constant flow rate of 1,600 l/day/m$^2$, the ultrafiltrate exhibiting a color of 6,000, corresponding to a 76% reduction, and an organic carbon concentration of 600.

The example is repeated without acrylic polymer additions; similar results are obtained.

While the invention has now been described in terms of various preferred process parameters, and exemplified with respect thereto, the skilled artisan will appreciate that various substitutions, changes, omissions, and modifications may be made without departing from the spirit thereof. Accordingly, it is intended that the scope of the invention be limited solely by that of the following claims.

What is claimed is:

1. A process for the treatment of soda-containing paper mill effluents from the bleaching of paper pulp comprising the steps of:
    (a) introducing a sub-critical amount of a flocculation-effective agent to the effluent, said sub-critical amount being from about 2% to about 50% of the amount necessary for true flocculation; and,
    (b) subjecting the effluent/agent mixture to ultrafiltration, comprising ultrafiltering said mixture across a membrane which is stable to a pH of greater than 8.

2. The process of claim 1, wherein the amount of said agent introduced is from about 7% to about 15%.

3. The process of claim 1, wherein said agent is selected from the group consisting of:
    (a) calcium hydroxide and aluminum sulfate;
    (b) calcium hydroxide and carbon dioxide;
    (c) calcium chloride and sodium carbonate; and,
    (d) aluminum chlorosulfate.

4. The process of claim 3, further comprising the addition of a flocculation adjuvant of sodium acrylate/acrylamide copolymers in the range of from about 0.1 to about 10% based on the weight of the inorganic constituent of said agent.

5. The process of claim 1, wherein the ultrafiltration step comprises ultrafiltering said mixture across a membrane having a cut-off threshhold towards proteins of from about 4,000 to about 100,000.

6. The process of claim 1, wherein the ultrafiltration step comprises ultrafiltering said mixture across a membrane having a cut-off threshhold towards proteins of from about 5,000 to about 25,000.

7. The process of claim 5, wherein said membrane is stable to a pH of greater than 10.

8. The process of claim 5, wherein said membrane has a flow rate, with pure water at 2 bars, of at least about 700 l/day/m$^2$.

9. The process of claim 5, wherein said membrane has a flow rate, with pure water at 2 bars, of at least about 4,000 l/day/m$^2$.

10. The process of claim 5, wherein the ultrafiltration step further comprises:
    (a) maintaining a pressure differential across said membrane of from about 0.5 to about 20 bars; and,
    (b) providing a flow rate of said mixture across said membrane of at least 0.1 m/second.

11. The process of claim 5, wherein the ultrafiltration step further comprises:
    (a) maintaining a pressure differential across said membrane of from about 1 to about 6 bars; and,
    (b) providing a flow rate of said mixture across said membrane of from about 1 to about 3 m/second.

* * * * *